United States Patent
Murashkin (10) Patent No.: US 11,443,443 B2
(45) Date of Patent: Sep. 13, 2022

(54) METHOD AND A DATA PROCESSING SYSTEM FOR ALIGNING A FIRST PANORAMIC IMAGE AND A SECOND PANORAMIC IMAGE IN A NAVIGATION PROCEDURE

(71) Applicant: SIEMENS INDUSTRY SOFTWARE INC., Plano, TX (US)

(72) Inventor: Vladislav Murashkin, Ann Arbor, MI (US)

(73) Assignee: Siemens Industry Software Inc, Plano, TX (US)

( * ) Notice: Subject to any disclaimer, the term of this patent is extended or adjusted under 35 U.S.C. 154(b) by 232 days.

(21) Appl. No.: 16/930,888

(22) Filed: Jul. 16, 2020

(65) Prior Publication Data
US 2022/0020162 A1 Jan. 20, 2022

(51) Int. Cl.
*G06T 7/33* (2017.01)
*G06T 7/38* (2017.01)
(Continued)

(52) U.S. Cl.
CPC .............. *G06T 7/33* (2017.01); *G06T 3/4038* (2013.01); *G06T 7/38* (2017.01); *G06V 10/443* (2022.01)

(58) Field of Classification Search
CPC ........... G06T 7/33; G06T 3/4038; G06T 7/38; G06T 2207/30252; G06T 7/30; G06V 10/443
See application file for complete search history.

(56) References Cited

U.S. PATENT DOCUMENTS 8,788,968 B1 * 7/2014 Filip .................... G06F 3/04845
715/764
11,080,871 B2 8/2021 Sheridan et al.
(Continued)

FOREIGN PATENT DOCUMENTS

EP 3940640 A1 * 1/2022
WO 2017192166 A1 11/2017
WO WO-2017206042 A1 * 12/2017 ......... G02B 27/0172

OTHER PUBLICATIONS

Ebrahim Karami et al.: "Image Matching Using Sift, Surf, Brief and ORB: Performance Comparison for Distorted Images", Faculty of Engineering and Applied Sciences, Memorial University, Canada, 2017.
Pablo F. Alcantarilla et al.: "KAZE Features", European Conference on Computer Vision (ECCV), Florence, Italy, Oct. 2012, Part VI, LNCS 7577, pp. 214-227.
(Continued)

*Primary Examiner* — Charles T Shedrick
(74) *Attorney, Agent, or Firm* — Laurence A. Greenberg; Werner H. Stemer; Ralph E. Locher (57) ABSTRACT

A method aligns a first panoramic image and a second panoramic image in a navigation procedure. The method includes using a computer vision algorithm for extracting features that are present in the panoramic images and use the extracted features to prepare a first feature vector for the first panoramic image and a second feature vector for the second panoramic image. The first and the second feature vectors are compared and matches in both the first and the second feature vectors that are above a determined threshold are identified. For the identified matches in each of the first and the second feature vectors for each of the two images, the perspective angle between a reference point of the respective image and the features according to the identified matches are determined. Finally, a difference between the determined perspective angles for a part of the identified matches in the panoramic images is determined.

14 Claims, 4 Drawing Sheets

(51) Int. Cl.
    *G06V 10/44*     (2022.01)
    *G06T 3/40*     (2006.01)

(56) References Cited

U.S. PATENT DOCUMENTS

| | | | | |
|---|---|---|---|---|
| 2009/0213112 | A1* | 8/2009 | Zhu | G06T 19/003 345/419 |
| 2012/0293607 | A1* | 11/2012 | Bhogal | G06T 3/4038 348/E5.051 |
| 2012/0294549 | A1* | 11/2012 | Doepke | G06T 3/4038 382/294 |
| 2018/0101934 | A1* | 4/2018 | Cai | G06T 7/73 |

OTHER PUBLICATIONS

Aparna, Taneja et al: "Registration of Spherical Panoramic Images with Cadastral 3D Models"; 2012 Second Joint 3DIM/3DPVT Conference: 3D Imaging, Modeling, Processing, Visualization and Transmission IEEE; Oct. 13, 2012 (Oct. 13, 2012), pp. 479-486, XP032277311.

Mannan, Ding et al: "Image Registration Based on Log-Polar Transform and SIFT Features"; 2010 International Conference on Computational and Information Sciences (ICCIS), IEEE Dec. 17, 2010 (Dec. 17, 2010), pp. 749-752, XP031901101.

Bowen, Francis et al: "A Multistage Approach for Image Registration"; IEEE Transactions on Cybernetics, vol. 46, No. 9, Sep. 1, 2016 (Sep. 1, 2016), pp. 2119-2131, XP011620117.

* cited by examiner

FIG. 2

$$d_1 = \alpha_{12} - \alpha_{11}$$
$$d_2 = \alpha_{22} - \alpha_{21}$$
$$\overline{d}_L = \frac{d_1 + d_2}{2}$$

FIG. 3

$$d_3 = \beta_{12} - \beta_{11}$$
$$d_4 = \beta_{22} - \beta_{21}$$
$$\overline{d}_V = \frac{d_3 + d_4}{2}$$

METHOD AND A DATA PROCESSING SYSTEM FOR ALIGNING A FIRST PANORAMIC IMAGE AND A SECOND PANORAMIC IMAGE IN A NAVIGATION PROCEDURE

BACKGROUND OF THE INVENTION

Field of the Invention

The present disclosure is directed, in general, to a method and a data processing system for aligning a first panoramic image and a second panoramic image in a navigation procedure.

Panoramic images are widely used for a virtual navigation of indoor environments, such as facilities, factories, shopping malls and the like, and outdoor environments, such as Google Street View. In industrial settings, these images are often produced as a result of a laser scan.

The real scene may include a variety of real objects which are related for example to a facility or a panoramic image of a street or a place or the like. Examples of real objects include, but are not limited to, equipment pieces, tools, containers, material pieces, finished or semi-finished products, houses, light posts, trees and other objects and landmarks present in the real scene. During the creation of these images, it is necessary to align their direction of view. This is for example done to allow navigation along a path by means of transitions between panoramic images (transition from one image to the other or respective next one). This alignment is currently done by recording the camera's direction at the moment of the image capture.

Unfortunately, this direction information is not always available. It might not be available at all when the images are captured by a device that does not provide that information. Another scenario is that after a series of images were taken and aligned and sometime after this capture some of the images are recaptured and updated, the original parameters might be unknown. This problem is currently solved by recapturing the entire series of images instead of updating some of them and by aligning the images manually. Further, direction information could be lost during the transfer of the captured images to a host due to unexpected communication network failure or the like.

BRIEF SUMMARY OF THE INVENTION

It is therefore the objective of the present invention to provide a method and a data processing system for aligning a first panoramic image and a second panoramic image in a navigation procedure that provide a simple way to avoid manual intervention or cumbersome capturing in order to generate a panoramic stream of images during the virtual navigation in indoor and/or outdoor environments.

Various disclosed embodiments of the present invention include methods and corresponding systems and computer-readable mediums. A method for aligning a first panoramic image and a second panoramic image in a navigation procedure is disclosed, the method including the following steps of:
a) using a computer vision algorithm for extracting features that are present in the first panoramic images and/or in the second panoramic image and using the extracted features to prepare a first feature vector for the first panoramic image and a second feature vector for the second panoramic image;
b) comparing the first and the second feature vector and identifying matches in both the first and the second feature vector that are above a determined threshold;
c) determining for the identified matches in each of the first and the second feature vectors for each of the two images the perspective angle between a reference point of the respective image and the features according to the identified matches; and
d) determining the difference between the determined perspective angles for at least part of the identified matches in the first and the second image.

In another example, a data processing system is provided. The data processing system contains a processor and an accessible memory, the data processing system is particularly configured to align a first panoramic image and a second panoramic image in a navigation procedure. The alignment containing the following steps of:
a) using a computer vision algorithm for extracting features that are present in the first panoramic images and/or in the second panoramic image and using the extracted features to prepare a first feature vector for the first panoramic image and a second feature vector for the second panoramic image;
b) comparing the first and the second feature vector and identifying matches in both the first and the second feature vector that are above a determined threshold;
c) determining for the identified matches in each of the first and the second feature vectors for each of the two images the perspective angle between a reference point of the respective image and the features according to the identified matches; and
d) determining the difference between the determined perspective angles for at least part of the identified matches in the first and the second image.

In another example, a non-transitory computer-readable medium is provided. The non-transitory computer-readable medium is encoded with executable instructions that, when executed, cause one or more data processing systems to align a first panoramic image and a second panoramic image in a navigation procedure. The alignment containing the following steps of:
a) using a computer vision algorithm for extracting features that are present in the first panoramic images and/or in the second panoramic image and using the extracted features to prepare a first feature vector for the first panoramic image and a second feature vector for the second panoramic image;
b) comparing the first and the second feature vector and identifying matches in both the first and the second feature vector that are above a determined threshold;
c) determining for the identified matches in each of the first and the second feature vectors for each of the two images the perspective angle between a reference point of the respective image and the features according to the identified matches; and
d) determining the difference between the determined perspective angles for at least part of the identified matches in the first and the second image.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the detailed description below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

When reading the claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B.

Other features which are considered as characteristic for the invention are set forth in the appended claims.

Although the invention is illustrated and described herein as embodied in a method and a data processing system for aligning a first panoramic image and a second panoramic image in a navigation procedure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
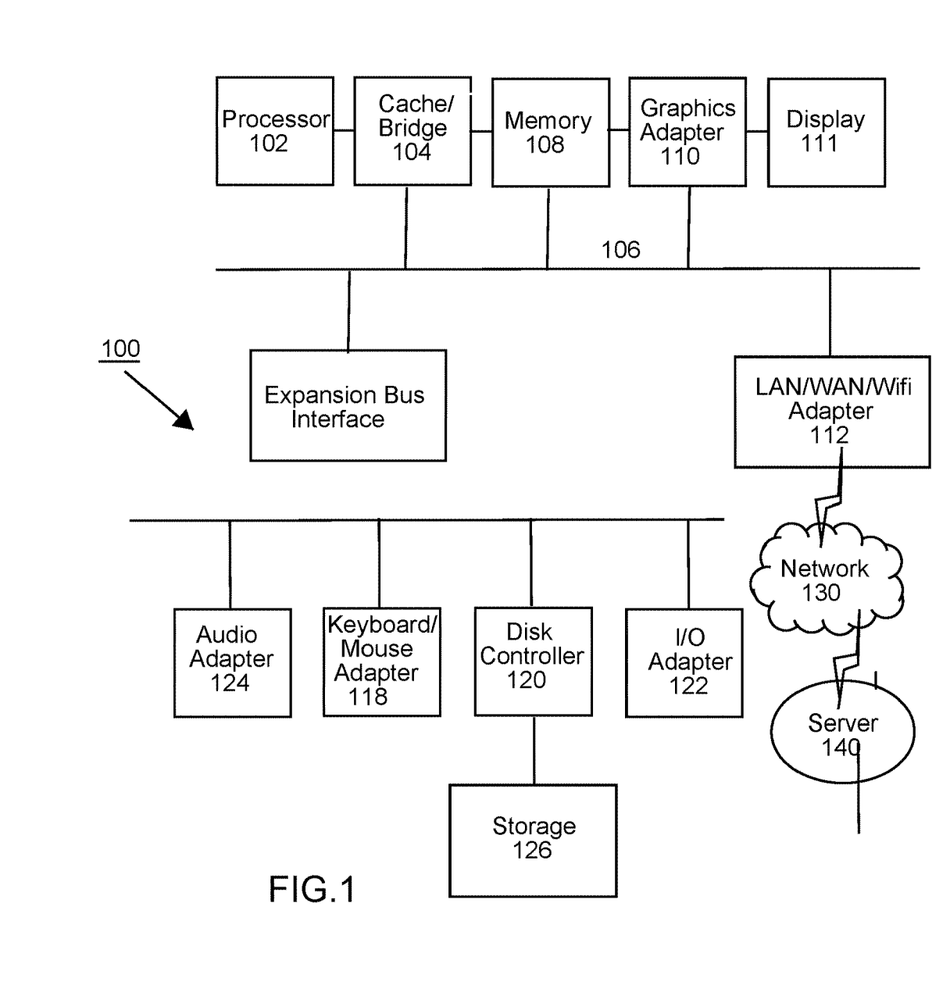
FIG. 1 is a block diagram of a data processing system in which an embodiment can be implemented.

Referring now to the figures of the drawings in detail and first, particularly to FIG. 1 thereof, there is shown a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. The local system bus 106 may be, for example, a peripheral component interconnect (PCI) architecture bus. Also connected to the local system bus 106 in the illustrated example are a main memory 108 and a graphics adapter 110. The graphics adapter 110 may be connected to a display 111.

Other peripherals, such as local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 116 in the example shown is an audio adapter 124, to which non-illustrated speakers may be connected for playing sounds. The keyboard/mouse adapter 118 provides a connection for a non-illustrated pointing device, such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over network 130 with server system 140, which is also not part of data processing system 100, but can be implemented, for example, as a separate data processing system 100.

Figure 2:
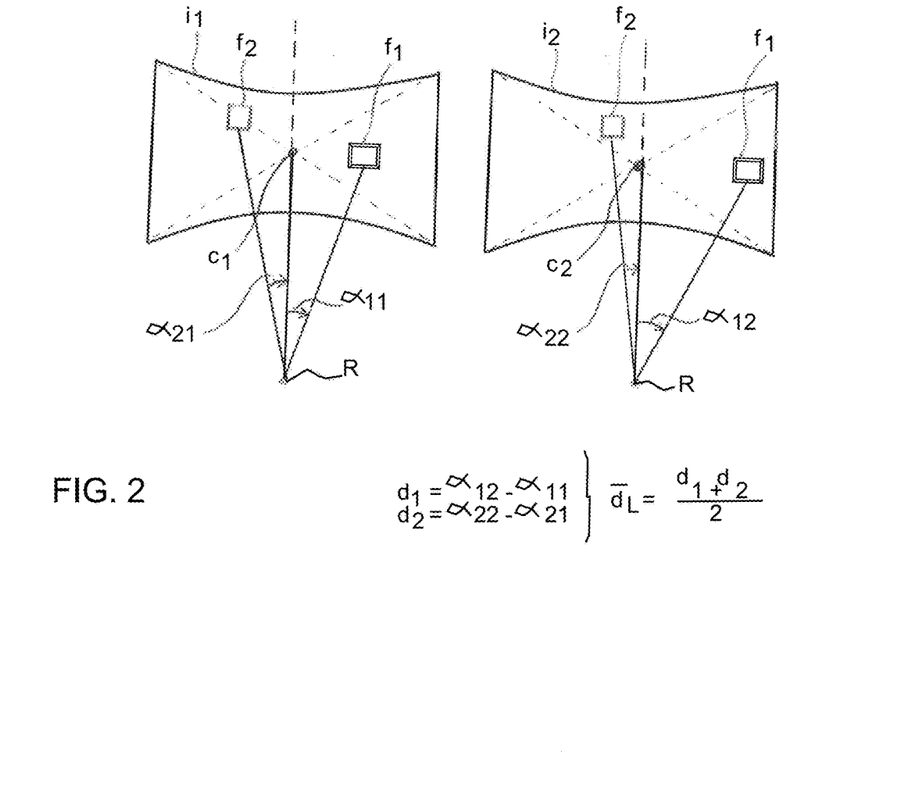
FIG. 2 is a schematic view of a series of two panoramic images that require an alignment of a horizontal direction.

FIG. 2 illustrates a schematic view of a illustrates a schematic view of a series of two panoramic images i1, i2 that require an alignment of the horizontal direction for their application in a navigation procedure, such as the panoramic view on a street or the like (i.e. Google Street View). During the capturing of the two images i1, i2, the two images i1, i2 have been taken at a different camera orientation, for example due to the trajectory of a camera car bearing the mounted camera on its roof and driving its way down through a specific road/street. When these images i1, i2 shall form part of a series of images that allows a user to navigate along the street, it is required that each image following the previous one is direction-wise aligned with the previous image. Thus, a consistent view on that street while navigating through this street is generated.

The present method for aligning a first panoramic image and a second panoramic image in a navigation procedure therefore exactly satisfies the demand on providing a simple method for the alignment of two images that have been taken at different physical positions without recording the exact camera direction for each image. After capturing the two images i1 and i2, a computer vision algorithm is used for extracting features that are present in the first panoramic images i1 and/or in the second panoramic image i2. The extracted features are then used to prepare a first feature vector v1 for the first panoramic image i1 and a second feature vector v2 for the second panoramic image i2. Typically, this image matching technique can be applied according to known image matching algorithms, such as scale invariant feature transform (SIFT), speed up robust feature (SURF), robust independent elementary features (BRIEF), oriented FAST, KAZE and rotated BRIEF (ORB) (also see E. Karami et al., "Image Matching Using SIFT, SURF, BRIEF and ORB: Performance Comparison for Distorted Images, 2017; Faculty of Engineering and Applied Sciences, Memorial University, Canada).

Then, the first feature vector v1 and the second feature vector v2 are compared in order to identify matches in both the first and the second feature vector v1, v2 that are above a determined threshold in terms of the resolution and/or the intensity of the extracted features. Preferably, the software algorithms are enabled to prioritize those extracted features where the angle of view is expected not to vary significantly from one image to the next image. Typically, these features can relate to those which are not in the lateral proximity of the camera but rather centrally located at the farer end the scene. For this specific image alignment, features f1 and f2 are considered in the following steps.

Once these matches are now identified for each of the features f1, f2 matching in both the first and the second feature vectors v1, v2 for each of the two images i1, i2, the perspective angle $\alpha_{m,n}$ between a reference point R of the respective image and the center of each features f1, f2 according to the identified matches is determined. The index m is the number of the feature and n is the number of the image. For this specific example, the first feature f1 in the first image i1 is located at an angle $\alpha_{11}$ and the second feature f2 at an angle $\alpha_{21}$ respectively. Correspondingly, the first feature f1 in the second image i2 is located at an angle $\alpha_{12}$ and the second feature f2 at an angle $\alpha_{22}$ respectively.

These angles now allow too calculate the difference d1 and d2 for each of the two feature f1, f2 in the two images i1 and i2. For feature f1, the difference d1 equals to $(\alpha_{12}-\alpha_{11})$, and for feature f2, the difference d2 is $(\alpha_{22}-\alpha_{21})$. These values for the lateral difference in the rotation of the two images relatively to each other can be used to yield a skimmed mean $d_L$ for the lateral rotation of image i1 relative image i2. In a panoramic film this skimmed mean $d_L$ can be applied to correct the position of image i2 relative to image i1 which leads to the result that the observer of the two images i1 and i2 in a video stream will have the sensation that both images i1 and i2 having been captured at the same orientation of the camera. It is needless to say that this process can be now applied to the couple of the second and a third image of the intended video stream and so on, in order provide a video stream of the passage through a specific street, such as this is intended by Google Street View for example.

Figure 3:
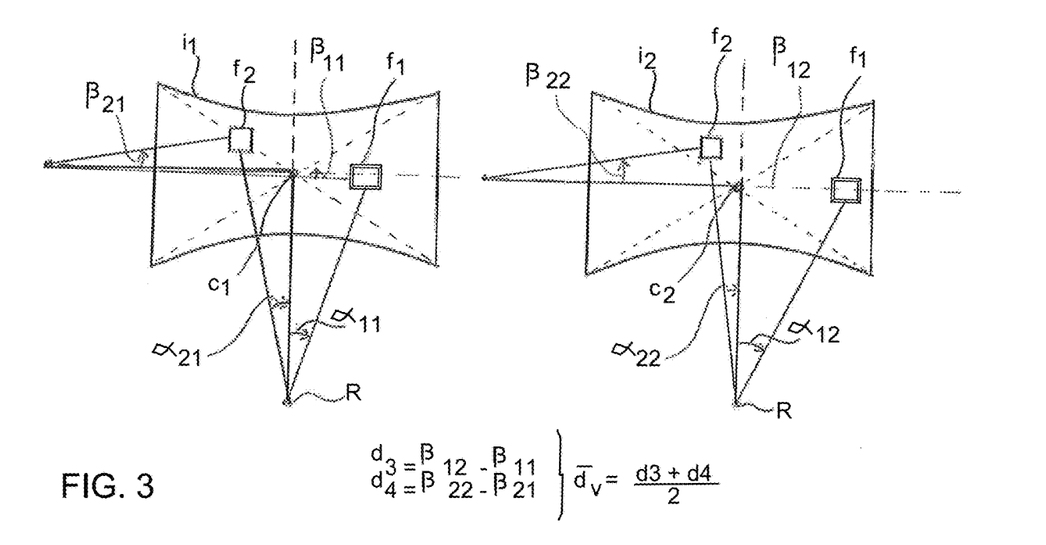
FIG. 3 is an illustration of the example of FIG. 2 for an alignment in a vertical direction.

This step can now be also repeated for the vertical rotation of the two images i1 and i2 as schematically shown in FIG. 3. The vertical rotation difference d3 for the feature f1 equals to $(\beta_{12}-\beta_{11})$; correspondingly the vertical rotation difference d4 for the feature f2 equals to $(\beta_{12}-\beta_{11})$. The skimmed mean $d_v$ for the vertical rotation equals analogously to $(d3+d4)/2$.

Figure 4:
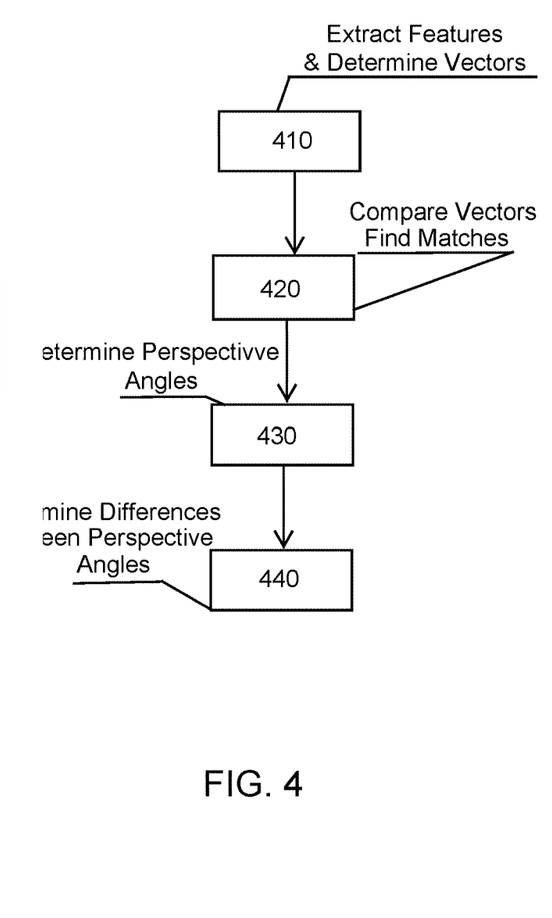
FIG. 4 is a flowchart of a process for aligning a first panoramic image and a second panoramic image in a navigation procedure in accordance with disclosed embodiments.
Figure 5:
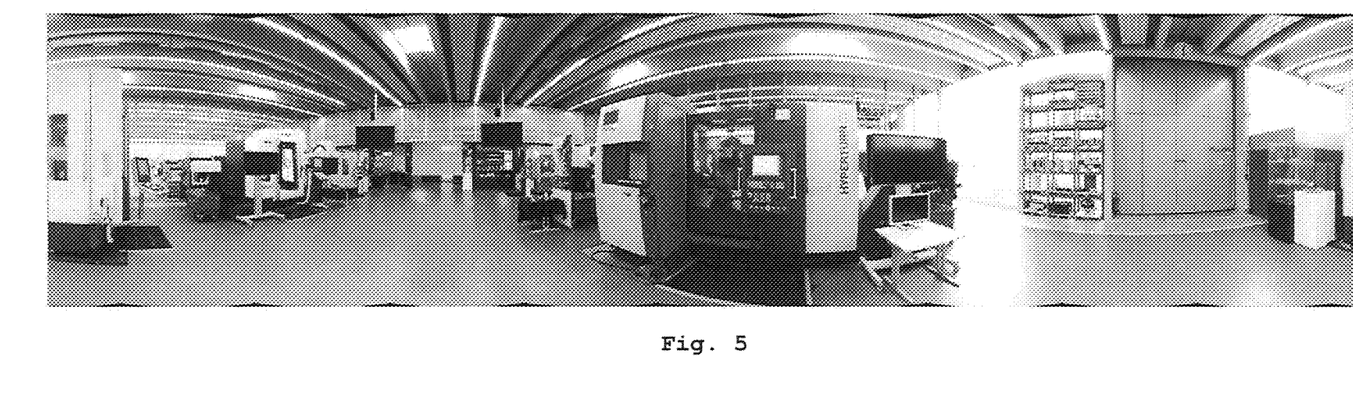
FIG. 5 is an illustration of a first real image taken at a first location with a first direction of lab scenery.
Figure 6:
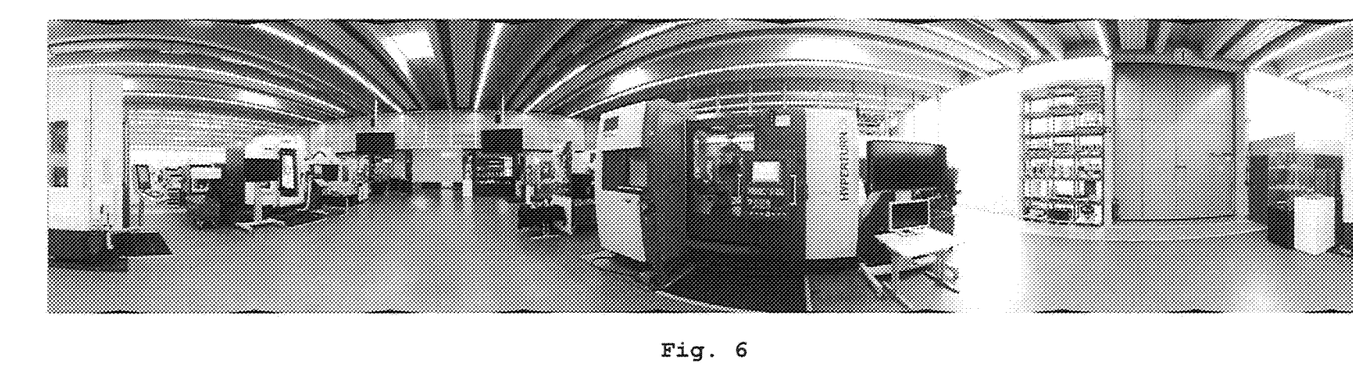
FIG. 6 is an illustration of a second real image taken at a second location with a second direction of the lab scenery of FIG. 5.

FIG. 4 illustrates a flowchart 400 of a method for aligning a first panoramic image and a second panoramic image in a navigation procedure, the method containing the now described following steps.

At step 410 a computer vision algorithm is used for extracting features that are present in the first panoramic images and/or in the second panoramic image. Further, these extracted features are used to prepare a first feature vector for the first panoramic image and a second feature vector for the second panoramic image.

At step 420 the first and the second feature vector are compared to each other and matches are identified for those features that are present in both the first and the second feature vector and that are above a determined threshold, i.e. for the precision and/or the intensity.

At step 430, for the identified matches in each of the first and the second feature vectors for each of the two images the perspective angle between a reference point of the respective image and the features according to the identified matches is determined.

At step 440 the difference between the determined perspective angles for at least part of the identified matches in the first and the second image is determined yielding to the result that the difference in the rotation of first image relative to the second image can be determined and this rotation difference can be applied in navigation application in order to align the first and the second image using this rotation difference.

Example: We'll start with the two panoramic images according to FIGS. 5 and 6 that show a lab scenery taken at two different positions and two different orientations. After running KAZE algorithm on both images, a total of 2553 features are identified in a first image and 2680 in a second. A total of 39 features have a good match above a threshold between the two images. The KAZE algorithm is described in more detail in:

KAZE Features. Pablo F. Alcantarilla, Adrien Bartoli and Andrew J. Davison. In European Conference on Computer Vision (ECCV), Fiorenze, Italy, October 2012.

Figure 7:
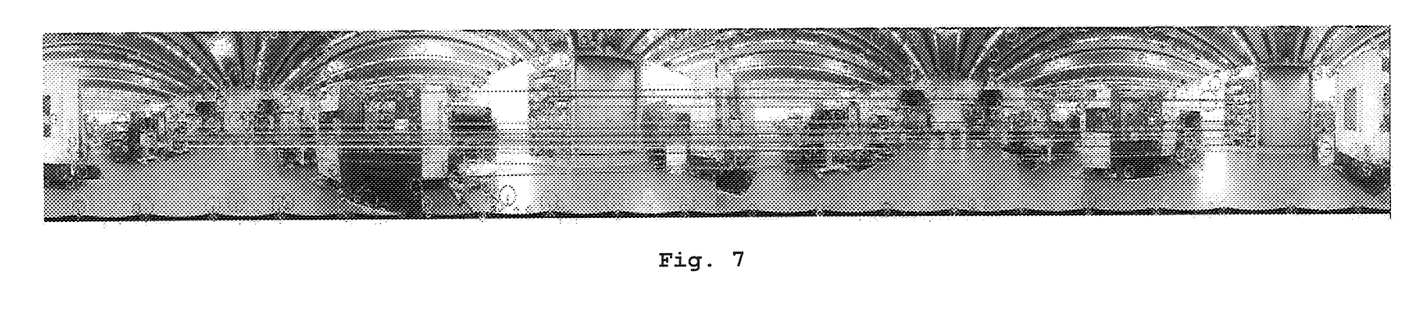
FIG. 7 is an illustration of identified matches that used to calculate a lateral correction in order to alignment the two panoramic images.

The resulting features and matches can be visualized as shown in FIG. 7 by the horizontal lines and dots in the two images presented side-by-side.

From the resulting array of 39 matching features, for each match, an angle of the feature from the center of the image is calculated for both images. For each match the difference of the respective angles in both images is calculated and added into an array holding the values for difference angles. A mean value of the array of the values for the difference angles is calculated and yield a lateral correction in the orientation from the first image relative to the other image. In order to discard outliers—features that were matched by mistake and resulting in an angle more than 10% larger or smaller than the mean value, a trimmed mean is calculated here. Thus, the two images can be presented in a navigation application as if they had been initially take with the same lateral orientation thereby allowing to generate a real eye stream of image as if a person would walk into the direction of the view without moving its head laterally.

One or more of the processor 102, the memory 108, and the alignment program running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from the storage 126, receiving from another device or process, receiving via an interaction with a user, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

The invention claimed is:

1. A method for aligning a first panoramic image and a second panoramic image in a navigation procedure, which comprises the following steps of:
   using a computer vision algorithm for extracting features that are present in the first panoramic image and/or in the second panoramic image and using extracted features to prepare a first feature vector for the first panoramic image and a second feature vector for the second panoramic image;
   comparing the first and the second feature vector and identifying matches in both the first and the second feature vector that are above a determined threshold;
   determining for identified matches in each of the first and the second feature vectors for each of the first and second panoramic images a perspective angle between a reference point of a respective one of the first and second panoramic images and the features according to the identified matches; and
   determining a difference between determined perspective angles for at least part of the identified matches in the first and the second panoramic image.

2. The method according to claim 1, wherein the reference point is chosen to be a center of a respective one of the first and second panoramic images.

3. The method according to claim 1, wherein for at least part of the identified matches a center of a respective feature is identified and the determined perspective angles are determined based on an identified center and the reference point.

4. The method according to claim 1, wherein the difference between the determined perspective angles forms an array of angle differences.

5. The method according to claim 4, wherein a trimmed mean of values for an angle difference in said array are considered to be a rotation difference between the first and second panoramic images.

6. The method according to claim 3, wherein the identified center is a center of a respective one of the first and second panoramic images.

7. The method according to claim 4, wherein the rotation difference is applied in the navigation procedure for a spatial alignment of the first and second panoramic images.

8. A data processing system, comprising:
   a processor;
   an accessible memory coupled to said processor; and
   the data processing system being configured to perform an alignment procedure to align a first panoramic image and a second panoramic image in a navigation procedure, said alignment procedure containing the following steps of:

using a computer vision algorithm for extracting features that are present in the first panoramic image and/or in the second panoramic image and using extracted features to generate a first feature vector for the first panoramic image and a second feature vector for the second panoramic image;

comparing the first and the second feature vector and identifying matches in both the first and the second feature vector that are above a determined threshold;

determining for identified matches in each of the first and the second feature vector for each of the first and second panoramic images a perspective angle between a reference point of a respective one of the first and second panoramic images and the features according to the identified matches; and determining a difference between determined perspective angles for at least part of the identified matches in the first and the second panoramic image.

9. The data processing system according to claim 8, wherein the reference point is chosen to be a center of a respective one of the first or the second panoramic image.

10. The data processing system according to claim 8, wherein for at least part of the identified matches a center of the respective feature is identified and the perspective angles are determined based on an identified center and the reference point.

11. The data processing system according to claim 8, wherein a difference between the determined perspective angles forms an array of angle differences.

12. The data processing system according to claim 9, wherein a trimmed mean of values for an angle difference in said array are considered to be a rotation difference between the first and second panoramic images.

13. The method according to claim 10, wherein the identified center is a center of a respective one of the first and second panoramic images.

14. The method according to claim 12, wherein the rotation difference is applied in the navigation procedure for a spatial alignment of the first and second panoramic images.

\* \* \* \* \*